United States Patent
Alhamad et al.

(10) Patent No.: US 12,534,661 B2
(45) Date of Patent: Jan. 27, 2026

(54) WATER SHUT-OFF MATERIALS AND METHODS THEREOF

(71) Applicant: SAUDI ARABIAN OIL COMPANY, Dhahran (SA)

(72) Inventors: Luai A. Alhamad, Dammam (SA); Ali Abdullah M. Al-Taq, Dhahran (SA); Abdullah A. Alrustum, Dhahran (SA); Sajjad Aldarweesh, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/474,053

(22) Filed: Sep. 25, 2023

(65) Prior Publication Data
US 2025/0101289 A1    Mar. 27, 2025

(51) Int. Cl.
C09K 8/44 (2006.01)
E21B 33/13 (2006.01)

(52) U.S. Cl.
CPC .............. *C09K 8/44* (2013.01); *E21B 33/13* (2013.01)

(58) Field of Classification Search
None
See application file for complete search history.

(56) References Cited

U.S. PATENT DOCUMENTS 5,701,956 A    12/1997 Hardy et al.
8,985,212 B1 *  3/2015 Crespo ............. C09K 8/588
                                         166/305.1
2011/0098202 A1 *  4/2011 James .................. C09K 8/5083
                                          507/221
2013/0056215 A1    3/2013 Crews
2017/0349805 A1 * 12/2017 Musso ..................... C04B 28/02

FOREIGN PATENT DOCUMENTS

RU    2424426 C1    7/2011
RU    2456439 C1    7/2012
RU    2706149 C1    11/2019
(Continued)

OTHER PUBLICATIONS

Thomas, J., Musso, S., Catheline, S. et al. 2014. Expanding Cement for Improved Wellbore Sealing: Prestress Development, Physical Properties, and Logging Response. Paper presented at the SPE Deepwater Drilling and Completions Conference, Galveston, Texas, USA, Sep. 10-11. SPE-170306-MS.
(Continued)

*Primary Examiner* — Anuradha Ahuja
(74) *Attorney, Agent, or Firm* — Vorys, Sater, Seymour and Pease, LLP

(57) ABSTRACT

Water shut-off materials may comprise: a polyacrylamide; a crosslinker; an aqueous base fluid; and a plurality of magnesium oxide particles. Methods for using water shut-off materials may comprise: pumping a water shut-off material into a wellbore and to a target zone in a subterranean formation; wherein the water shut-off material comprises: a polyacrylamide; a crosslinker; an aqueous base fluid; and a plurality of magnesium oxide particles; allowing at least a portion of the plurality of magnesium oxide particles to react with the aqueous base fluid to form brucite within the target zone; allowing at least a portion of the polyacrylamide to crosslink within the target zone; and forming a seal in the target zone with the brucite and crosslinked polyacrylamide.

9 Claims, 3 Drawing Sheets

(56) References Cited

FOREIGN PATENT DOCUMENTS

| | | |
|---|---|---|
| RU | 2719699 C1 | 4/2020 |
| WO | 2009026021 A1 | 2/2009 |
| WO | WO 2011110802 * | 9/2011 ............. C09K 8/588 |

OTHER PUBLICATIONS

Jafariesfad, N., Geiker, M. R., and Skalle, P. 2017b. Nanosized Magnesium Oxide with Engineered Expansive Property for Enhanced Cement-System Performance. SPE J. 22 (5): 1681-1689. SPE-180038-PA.

Huang, J., Al-Mohsin, A. M., Bataweel, M. et al. 2017. Systematic Approach to Develop a Colloidal Silica Based Gel System for Water Shut-Off. Paper presented at the SPE Middle East Oil & Gas Show and Conference, Manama, Kingdom of Bahrain, Mar. 6-9. SPE-183942-MS.

Ma, Liping; Wang, Shitou; Long, Yifu; et al. "Novel Environmentally Benign Hydrogel: Nano-Silica Hybrid Hydrolyzed Polyacrylamide/ Polyethyleneimine Gel System for Conformance Improvement in High Temperature High Salinity Reservoir." Paper presented at the Abu Dhabi International Petroleum Exhibition & Conference, Abu Dhabi, UAE, Nov. 2017.

\* cited by examiner

WATER SHUT-OFF MATERIALS AND METHODS THEREOF

FIELD OF THE DISCLOSURE

The present disclosure relates generally to hydrocarbon production from subterranean formations and, more particularly, to water shut-off materials to seal fractures connecting a wellbore and a water-bearing zone.

BACKGROUND OF THE DISCLOSURE

The discovery and extraction of hydrocarbons, such as oil or natural gas, from subterranean formations may be impeded for a variety of reasons, such as produced water in the reservoir. Specifically, produced water is a significant concern for the oil and gas industry with produced water resulting in incurred handling costs and oil recovery costs, as well as affecting productivity through scale formation, corrosion of the field equipment, and potential formation failure. Before discharge or reinjection, the produced water needs to be treated to meet governmental regulations and to prevent environmental pollution. To overcome these issues economically, water production is minimized by water shut-off materials applied to zones via mechanical isolation or chemical-based isolation, or by drilling in a manner to avoid produced water. Polymer-based products exist for water shut-off and enhanced oil recovery, but they may lack chemical and thermal stability and effective placement.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, water shut-off materials may comprise: a polyacrylamide; a crosslinker; an aqueous base fluid; and a plurality of magnesium oxide particles.

In another embodiment, methods may comprise: pumping a water shut-off material into a wellbore and to a target zone in a subterranean formation; wherein the water shut-off material comprises: a polyacrylamide; a crosslinker; an aqueous base fluid; and a plurality of magnesium oxide particles; allowing at least a portion of the plurality of magnesium oxide particles to react with the aqueous base fluid to form brucite within the target zone; allowing at least a portion of the polyacrylamide to crosslink within the target zone; and forming a seal in the target zone with the brucite and crosslinked polyacrylamide.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1A:
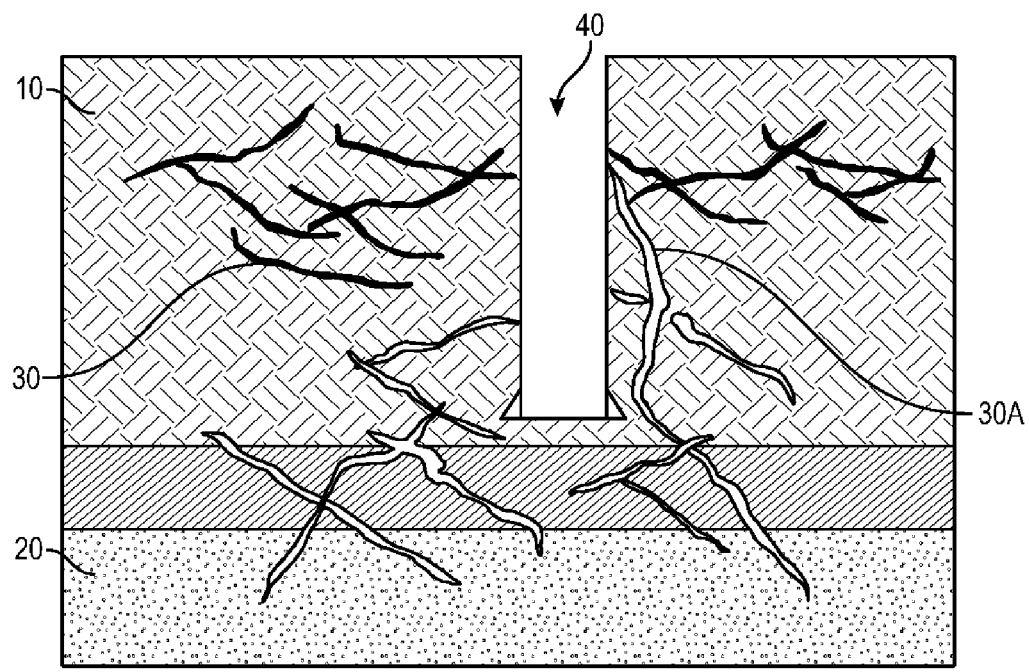
FIG. 1A is a schematic drawing of a subterranean formation showing fractures connecting a wellbore and a water-bearing zone.

Embodiments in accordance with the present disclosure generally relate to hydrocarbon production from subterranean formations and, more particularly, to water shut-off materials to seal fractures connecting a wellbore and a water-bearing zone. As mentioned previously, there is an ongoing need for compositions and methods for forming a barrier to shut off or reduce the unwanted production of water in a subterranean formation that possess chemical and thermal stability. Polyacrylamide polymers are commonly used in water shut-off applications to the effective physical properties of the polymers when crosslinked. However, polyacrylamide is associated with integrity and polymer-rock bond challenges when used at field conditions. High drawdown pressure may undermine the polymer-rock bond and adhesion with pore spaces which may result in incomplete water control.

The present disclosure addresses the aforementioned problems by providing water shut-off materials comprising both a polyacrylamide and magnesium oxide particles. The magnesium oxide particles, when applied to a target zone (e.g., a pore or fracture) in the subterranean formation, will react with an aqueous base fluid in the water shut-off material to form brucite. Due to brucite's lower density compared to magnesium oxide, the particles will expand in the target zone to form a seal, effectively reducing or stopping water production from a water-bearing zone.

The present disclosure is directed to water shut-off materials and methods for shutting off or reducing unwanted production of water within a subterranean formation. A subterranean formation is the fundamental unit of lithostratigraphy. As used in the present disclosure, the term "subterranean formation" may refer to a body of rock that is sufficiently distinctive and continuous from the surrounding rock bodies that the body of rock can be mapped as a distinct entity. A subterranean formation may be sufficiently homogenous to form a single identifiable unit containing similar geological properties throughout the subterranean formation, including, but not limited to, porosity, permeability, the like, and any combination thereof. A single subterranean formation may include different regions, where some regions include hydrocarbons and others do not. To produce hydrocarbons from the hydrocarbon regions of the subterranean formation, production wells are drilled to a depth that enables these hydrocarbons to travel from the subterranean formation to the surface.

The hydrocarbons from the hydrocarbon regions of the subterranean formation passes through fractures in the subterranean formation to reach a wellbore for extraction to the surface. As used in the present disclosure, the term "wellbore" may refer to the drilled hole or borehole, including the openhole or uncased portion of the well. Initially, the formation pressure may be considerably greater than the downhole pressure inside the wellbore. This differential pressure may drive hydrocarbons through fractures in the subterranean formation toward the wellbore and up to the surface.

However, the wellbore may also be in fluid communication with water-bearing zones within the subterranean formation. As used in the present disclosure, the term "water-bearing zones" may refer to the regions of the subterranean formation having water that occurs naturally within the pores of rock. The fractures within the subterranean formation which allows for hydrocarbons to flow to the wellbore also allows formation water from the water-bearing zones to flow to the wellbore.

Embodiments of the present disclosure include water shut-off materials and methods of forming a seal to shut off or reduce unwanted production of water in a subterranean formation. Water shut-off materials of the present disclosure may comprise a polyacrylamide; a crosslinker; an aqueous base fluid; and a plurality of magnesium oxide particles.

Methods of the present disclosure may comprise pumping a water shut-off material into a wellbore and to a target zone in a subterranean formation; wherein the water shut-off material comprises a polyacrylamide; a crosslinker; an aqueous base fluid; and a plurality of magnesium oxide particles; allowing at least a portion of the plurality of magnesium oxide particles to react with the aqueous base fluid to form brucite within the target zone; allowing at least a portion of the polyacrylamide to crosslink within the target zone; and forming a seal in the target zone with the brucite and crosslinked polyacrylamide.

Figure 1B:
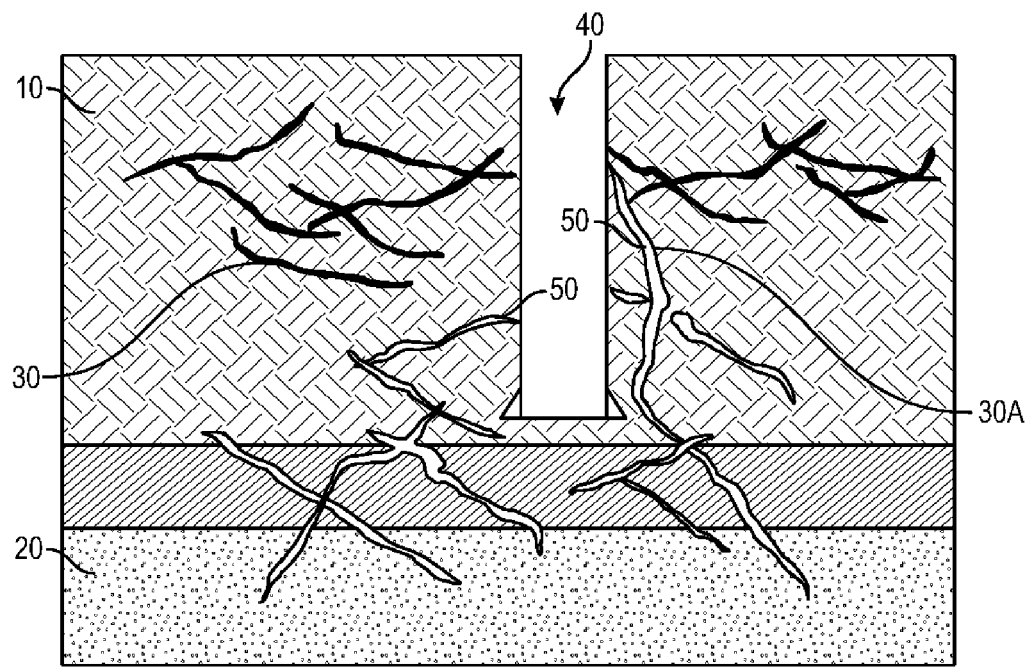
FIG. 1B is a schematic drawing of the subterranean formation of FIG. 1A with injection of the water shut-off material in accordance with one or more embodiments of the present disclosure.

With reference to FIGS. 1A and 1B, a production well and associated fractures are illustrated. The subterranean formation includes a hydrocarbon-bearing zone 10 and a water-bearing zone 20. The hydrocarbon-bearing zone 10 is characterized by the region of the subterranean formation which includes recoverable hydrocarbons within the matrix of the subterranean formation. The water-bearing zone 20 is characterized by the region of the subterranean formation having water that occurs naturally within the pores of rock. Each of the hydrocarbon-bearing zones 10 and the water-bearing zones 20 are interlaced with fractures 30 (including water-producing fractures 30A) which facilitate the flow of hydrocarbons, formation water, or both through the subterranean formation. To recover the hydrocarbons within the subterranean formation, a wellbore 40 is provided within the subterranean formation in fluid communication with the fractures 30.

The water-bearing zone 20 of the subterranean formation may be sequestered from the wellbore 40 by the introduction of the water shut-off material 50 into water-producing fractures 30A in the subterranean formation. It will be appreciated that the water-producing fractures 30A may comprise one or more fractures 30 that are in fluid communication with the water-bearing zone 20 and the wellbore 40 and thus are capable of flowing formation water from the water-bearing zone 20 to the wellbore 40. FIG. 1A provides an illustration of the subterranean formation prior to the treatment in accordance with methods of the present disclosure and FIG. 1B provides an illustration of the water-producing fractures 30A sealed with the water shut-off material 50. After sealing with the water shut-off material 50, the water-producing fractures 30A may no longer transport water to the wellbore 40.

It will be appreciated that the fractures 30 and water-producing fractures 30A interlaced throughout the subterranean formation may be naturally occurring or induced with enhanced oil recovery techniques such as fracturing operations. The methods for shutting off or reducing unwanted production of water in the subterranean formation with the water shut-off material of the present disclosure may be applied to all fractures 30 or water-producing fractures 30A regardless of whether they are naturally occurring or induced with enhanced oil recovery techniques.

Forming a seal to shut off or reduce unwanted production of water in a subterranean formation involves injecting a water shut-off material 50 in accordance with the present disclosure into one or more water-producing fractures in the subterranean formation. It will be appreciated that the water shut-off material 50 may be injected into the water-producing fractures in accordance with methods and techniques familiar to those skilled in the art for placement of drilling or treatment fluids within the fractures of a subterranean formation. In one or more embodiments, the water shut-off material 50 may be injected into the water-producing fractures via coiled tubing or production tubing placed downhole. As used herein, the term "production tubing" refers to a wellbore tubular used to produce reservoir fluids. Production tubing is assembled with other completion components to make up the production string. The production tubing selected for any completion should be compatible with the wellbore geometry, reservoir production characteristics, and reservoir fluids. As used herein, the term "coiled tubing" refers to a long, continuous length of pipe wound on a spool. The pipe is straightened prior to pushing into a wellbore and rewound to coil the pipe back onto the transport and storage spool. It will be appreciated that coiled tubing may be 5,000 m or greater in length. Coiled tubing may be provided as a secondary and separated conduit through the wellbore and may be passed within the annulus of the production tubing. Coiled tubing may also be used as part of the production tubing. The water shut-off material 50 may further be directed to the fractures desired for treatment with the placement of bridge plugs or other devices to direct or obstruct flow.

Having described utilization of the water shut-off material 50 for water shut-off applications, the components and properties of the water shut-off material 50 will now be described in detail.

The water shut-off material is formed by combining a polyacrylamide with a crosslinker, an aqueous base solution, and a plurality of magnesium oxide particles. In one or more embodiments, the water shut-off material may have a concentration of the polyacrylamide of about 200 gallons per 1,000 gallons (gpt) to about 300 gpt, or about 200 gpt to about 275 gpt, or about 200 gpt to about 250 gpt, or about 200 gpt to about 225 gpt, or about 225 gpt to about 300 gpt, or about 225 gpt to about 275 gpt, or about 225 gpt to about 250 gpt, or about 250 gpt to about 300 gpt, or about 250 gpt to about 275 gpt, or about 275 gpt to about 300 gpt.

The crosslinker may be provided to increase the viscosity of the polyacrylamide by connecting the separate polymer strands together. In one or more embodiments, the crosslinker may include hydroquinone, hexamethylenetetramine, phenol/formaldehyde, polyethylenimine, acetylsalicylic acid, catechol, resorcinol, N,N'-methylenebisacrylamide, or any combination thereof. In one or more embodiments, the crosslinker may have a concentration in the water shut-off material of about 25 gpt to about 75 gpt, or about 25 gpt to about 50 gpt, or about 50 gpt to about 75 gpt.

The water used to form the aqueous base fluid of the water shut-off material may include one or more of deionized, tap, distilled, or fresh waters; natural, brackish, and saturated salt waters; natural, salt dome, hydrocarbon formation, produced, or synthetic brines; filtered or untreated seawaters; mineral waters; and other potable and non-potable waters containing one or more dissolved salts, minerals, or organic materials. A brine comprising a salt may be the preferred form of the aqueous base fluid. In one or more embodiments, the salt may be a monovalent salt, a divalent salt, or a combination of monovalent and divalent salts. For example, the salt may be one or more of potassium chloride, magnesium chloride, calcium chloride, or sodium chloride. Preferably, the salt may be potassium chloride.

The magnesium oxide particles may be sufficiently small so that the particles may be suspended within the water shut-off material. For example, the magnesium oxide particles may have a diameter of about 1 nm to about 100 nm, or about 1 nm to about 50 nm, or about 1 nm to about 25 nm, or about 1 nm to about 10 nm, or about 10 nm to about 100 nm, or about 10 nm to about 50 nm, or about 10 nm to about 25 nm, or about 25 nm to about 100 nm, or about 25 nm to about 50 nm, or about 50 nm to about 100 nm.

Furthermore, a concentration of the magnesium oxide particles it the water shut-off material may, for example, be about 0.01 wt % to about 1 wt %, or about 0.01 wt % to about 0.5 wt %, or about 0.01 wt % to about 0.1 wt %, or about 0.01 wt % to about 0.05 wt %, or about 0.05 wt % to about 1 wt %, or about 0.05 wt % to about 0.5 wt %, or about 0.05 wt % to about 0.1 wt %, or about 0.1 wt % to about 1 wt %, or about 0.1 wt % to about 0.5 wt %, or about 0.5 wt % to about 1 wt %.

Water shut-off materials require high viscosity to ensure successful sealing of the target zone in the subterranean formation (e.g., a fracture). The water shut-off materials of the present disclosure, when exposed to field conditions, may still be highly viscous. For example, the water shut-off material may have a viscosity of about 8,000 cp to about 12,000 cp, or about 8,000 cp to about 11,000 cp, or about 8,000 cp to about 10,000 cp, or about 8,000 cp to about 9,000 cp, or about 9,000 cp to about 12,000 cp, or about 9,000 cp to about 11,000 cp, or about 9,000 cp to about 10,000 cp, or about 10,000 cp to about 12,000 cp, or about 10,000 cp to about 11,000 cp, or about 11,000 cp to about 12,000 cp at a temperature of 200° F. and pressure of 500 psi.

Embodiments disclosed herein include:

A. Water shut-off materials. The water shut-off materials comprise: a polyacrylamide; a crosslinker; an aqueous base fluid; and a plurality of magnesium oxide particles.

B. Methods for using water shut-off materials. The methods comprise: pumping a water shut-off material into a wellbore and to a target zone in a subterranean formation; wherein the water shut-off material comprises: a polyacrylamide; a crosslinker; an aqueous base fluid; and a plurality of magnesium oxide particles; allowing at least a portion of the plurality of magnesium oxide particles to react with the aqueous base fluid to form brucite within the target zone; allowing at least a portion of the polyacrylamide to crosslink within the target zone; and forming a seal in the target zone with the brucite and crosslinked polyacrylamide.

Each of embodiments A and B may have one or more of the following additional elements in any combination:

Element 1: wherein a concentration of the polyacrylamide in the water shut-off material is about 200 gallons per 1,000 gallons (gpt) to about 300 gpt.

Element 2: wherein a concentration of the crosslinker in the water shut-off material is about 25 gpt to about 75 gpt.

Element 3: wherein a concentration of the plurality of magnesium oxide particles in the water shut-off material is about 0.01 wt % to about 1 wt %.

Element 4: wherein the aqueous base fluid comprises a salt.

Element 5: wherein the salt comprises potassium chloride.

Element 6: wherein a viscosity of the water shut-off material is about 8,000 cp to about 12,000 cp at a temperature of 200° F. and pressure of 500 psi.

By way of non-limiting example, exemplary combinations applicable to A and B include, but are not limited to: 1 and 2; 1 and 3; 1 and 4; 1 1 and 6; 2 and 3; 2 and 5; 2 and 6; 3 and 4; 3 and 6; 4 and 5; 4 and 6; 5 and 6; 1-3; and 1-3 and 6.

The present disclosure is further directed to the following non-limiting clauses:

Clause 1. A water shut-off material comprising:
   a polyacrylamide;
   a crosslinker;
   an aqueous base fluid; and
   a plurality of magnesium oxide particles.

Clause 2. The water shut-off material of clause 1, wherein a concentration of the polyacrylamide in the water shut-off material is about 200 gallons per 1,000 gallons (gpt) to about 300 gpt.

Clause 3. The water shut-off material of clause 1 or clause 2, wherein a concentration of the crosslinker in the water shut-off material is about 25 gpt to about 75 gpt.

Clause 4. The water shut-off material of any one of clauses 1-3, wherein a concentration of the plurality of magnesium oxide particles in the water shut-off material is about 0.01 wt % to about 1 wt %.

Clause 5. The water shut off-material of any one of clauses 1-4, wherein the aqueous base fluid comprises a salt.

Clause 6. The water shut off-material of clause 5, wherein the salt comprises potassium chloride.

Clause 7. The water shut-off material of any one of clauses 1-6, wherein a viscosity of the water shut-off material is about 8,000 cp to about 12,000 cp at a temperature of 200° F. and pressure of 500 psi.

Clause 8. A method comprising:
   pumping a water shut-off material into a wellbore and to a target zone in a subterranean formation;
      wherein the water shut-off material comprises:
         a polyacrylamide;
         a crosslinker;
         an aqueous base fluid; and
         a plurality of magnesium oxide particles;
   allowing at least a portion of the plurality of magnesium oxide particles to react with the aqueous base fluid to form brucite within the target zone;
   allowing at least a portion of the polyacrylamide to crosslink within the target zone; and
   forming a seal in the target zone with the brucite and crosslinked polyacrylamide.

Clause 9. The method of clause 8, wherein a concentration of the polyacrylamide in the water shut-off material is about 200 gpt to about 300 gpt.

Clause 10. The method of clause 8 or clause 9, wherein a concentration of the crosslinker in the water shut-off material is about 25 gpt to about 75 gpt.

Clause 11. The method of any one of clauses 8-10, wherein a concentration of the plurality of magnesium oxide particles in the water shut-off material is about 0.01 wt % to about 1 wt %.

Clause 12. The method of any one of clauses 8-11, wherein the aqueous base fluid comprises a salt.

Clause 13. The method of clause 12, wherein the salt comprises potassium chloride.

Clause 14. The method of any one of clauses 8-14, wherein a viscosity of the water shut-off material is about 8,000 cp to about 12,000 cp at a temperature of 200° F. and pressure of 500 psi.

EXAMPLES

Figure 2:
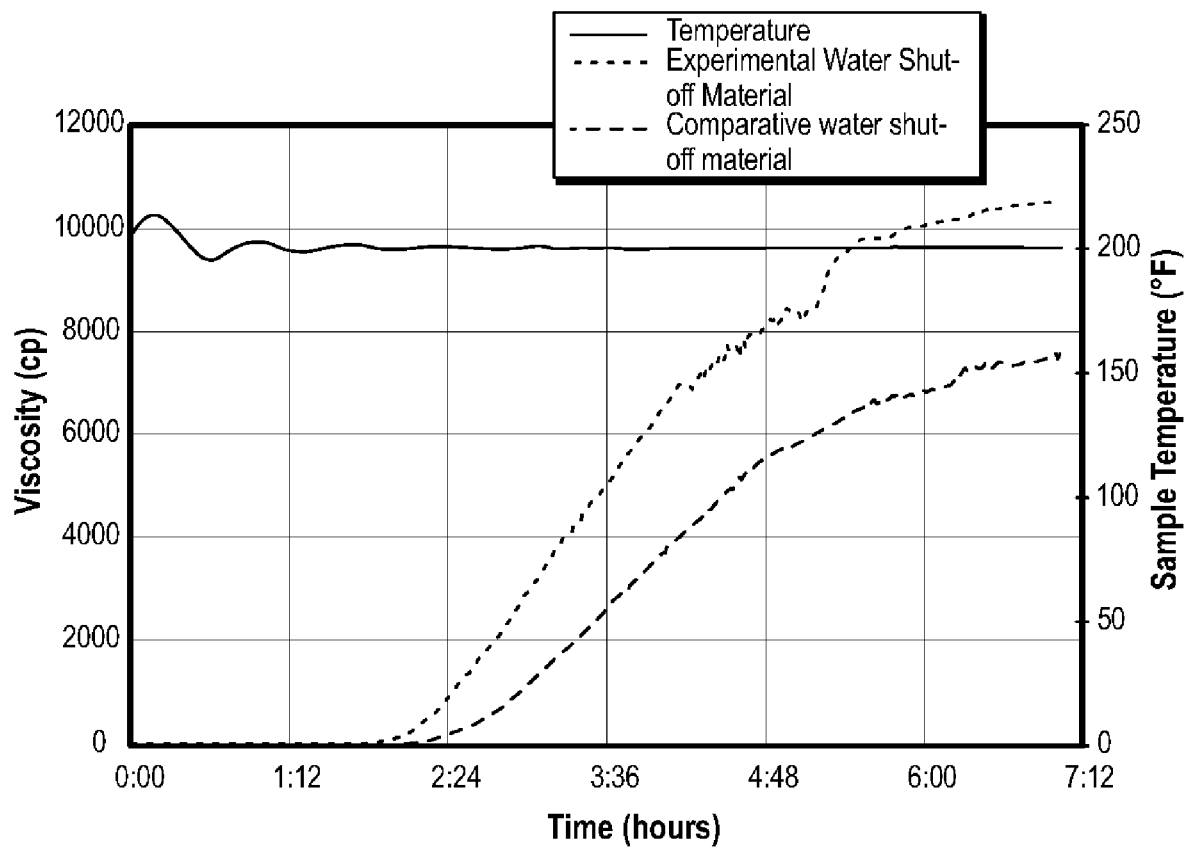
FIG. 2 is a graph of a time-dependent viscosity of a comparative water shut-off material and an experimental water shut-off material according to one or more embodiments of the present disclosure.

Experimental and comparative water shut-off materials were prepared with or without magnesium oxide particles, respectively. Both water shut-off materials contained 5 wt % potassium chloride, 250 gpt polyacrylamide, 40 gpt crosslinker, and enough water to prepare 1,000 L of water shut-off material. Additionally, the experimental water shut-off material contained 0.1 wt % of magnesium oxide particles. FIG. 2 shows the time-dependent viscosities (measured at a shear rate of 25 s$^{-1}$) of both water shut-off materials under temperatures of 200° F. and pressures of 500 psi. The experimental and comparative water shut-off materials each exhibited an increase in viscosity after about two hours, which may be referred to as the gelation time. However, after about seven hours under high temperature and pressure, the experimental water shut-off material had a significantly higher viscosity than the comparative.

Figure 3:
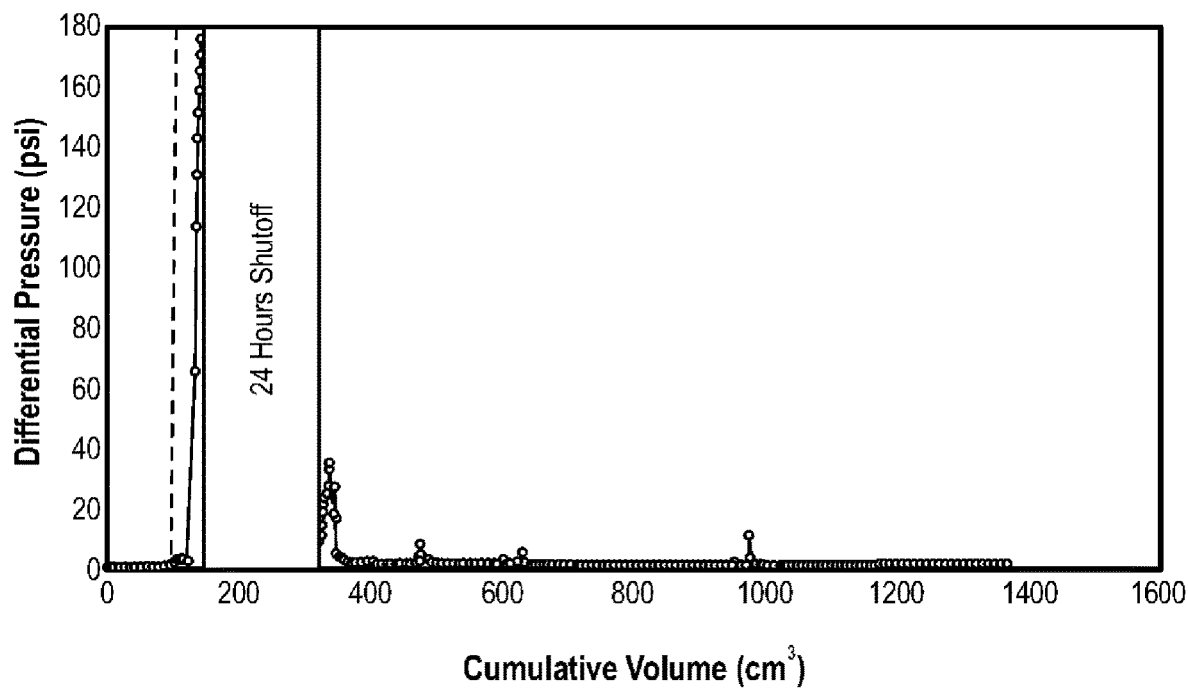
FIG. 3 is a graph of a differential pressure applied to a comparative water shut-off material as a function of cumulative injected volume of brine.
Figure 4:
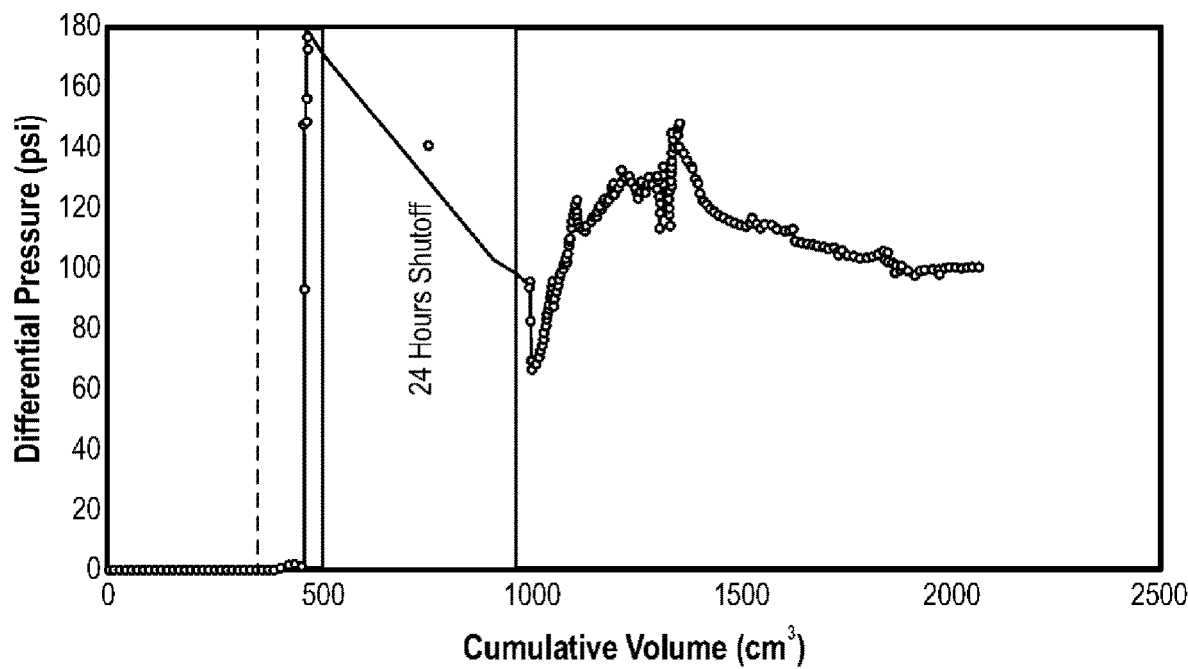
FIG. 4 is a graph of a differential pressure applied to a water shut-off material in accordance with one or more embodiments of the present disclosure as a function of cumulative injected volume of brine.

A coreflooding test was conducted to mimic downhole conditions to evaluate the effect of the magnesium oxide particles on the polymer-rock bonding of the water shut-off materials. The comparative water shut-off material was compared to the experimental water shut-off material to determine the materials' ability to resist differential pressures applied during coreflooding. Individually, each water shut-off material was placed inside a simulated fracture hole within the core plug. Then, the core plug was covered with a rubber sleeve and was placed inside the core holder under 200° F. and 2,500 psi. After 24 hours, a potassium chloride brine was injected against the sealed core plug. Ideally, the water shut-off material will stay intact under this applied pressure. Failure to resist build-up pressure may be a result of poor water shut-off performance, or polymer-rock bonding. FIGS. 3 and 4 show the differential pressure applied to the comparative and experimental water shut-off materials, respectively, as a function of cumulative injected volume of brine. FIGS. 3 and 4 confirm that the experimental water shut-off material was more effective than the comparative. For the comparative water shut-off material, the differential pressure dropped after injecting the brine following a 24 hour shutoff time. However, the experimental water shut-off material was able to sustain the differential pressure.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by one or more embodiments described herein. At the very least, and not as an attempt to limit the application of the doctrine of equivalents to the scope of the claim, each numerical parameter should at least be construed in light of the number of reported significant digits and by applying ordinary rounding techniques.

The invention claimed is:

1. A method comprising:
   pumping a water shut-off material into a wellbore and to a target zone in a subterranean formation;
   wherein the water shut-off material comprises:
      a polyacrylamide;
      a crosslinker;
      an aqueous base fluid; and
      a plurality of magnesium oxide particles, wherein the plurality of magnesium oxide particles has a diameter of 1 nm to 100 nm, and wherein the plurality of magnesium oxide particles is suspended within the water shut-off material; and
      wherein a viscosity of the water shut-off material is in a range of 8,000 cp to 12,000 cp at a temperature of 200° F. and pressure of 500 psi;
   allowing at least a portion of the plurality of magnesium oxide particles to react with the aqueous base fluid to form brucite within the target zone;
   allowing at least a portion of the polyacrylamide to crosslink within the target zone; and
   forming a seal in the target zone with the brucite and the crosslinked polyacrylamide.

2. The method of claim 1, wherein a concentration of the polyacrylamide in the water shut-off material is 200 gpt to 300 gpt.

3. The method of claim 1, wherein a concentration of the crosslinker in the water shut-off material is 25 gpt to 300 gpt.

4. The method of claim 1, wherein a concentration of the plurality of magnesium oxide particles in the water shut-off material is 0.01 wt % to 1 wt %.

5. The method of claim 4, wherein the target zone comprises a water-producing fracture.

6. The method of claim 1, wherein the aqueous base fluid comprises a salt.

7. The method of claim 6, wherein the salt comprises potassium chloride.

8. A method comprising:
   pumping a water shut-off material into a wellbore and to a target zone in a subterranean formation;
   wherein the water shut-off material comprises:
      a polyacrylamide, wherein a concentration of the polyacrylamide in the water shut-off material is 200 gpt to 300 gpt;
      a crosslinker, wherein a concentration of the crosslinker in the water shut-off material is 25 gpt to 75 gpt;
      an aqueous base fluid comprising a salt; and
      a plurality of magnesium oxide particles, wherein the plurality of magnesium oxide particles has a diameter of 1 nm to 100 nm, wherein the plurality of magnesium oxide particles is suspended within the water shut-off material, and wherein a concentration of the plurality of magnesium oxide particles in the water shut-off material is 0.01 wt % to 1 wt %; and
      wherein a viscosity of the water shut-off material is in a range of 8,000 cp to 12,000 cp at a temperature of 200° F. and pressure of 500 psi;
   allowing at least a portion of the plurality of magnesium oxide particles to react with the aqueous base fluid to form brucite within the target zone;
   allowing at least a portion of the polyacrylamide to crosslink within the target zone; and
   forming a seal in the target zone with the brucite and the crosslinked polyacrylamide.

9. The method of claim 8, wherein the salt comprises potassium chloride.

* * * * *